(12) United States Patent
Fowe et al.

(10) Patent No.: US 9,609,046 B2
(45) Date of Patent: Mar. 28, 2017

(54) LANE LEVEL ROAD VIEWS

(71) Applicant: HERE Global B.V., Veldhoven (NL)

(72) Inventors: James Adeyemi Fowe, Evanston, IL (US); Leon Oliver Stenneth, Chicago, IL (US); Gavril Adrian Giurgiu, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 34 days.

(21) Appl. No.: 14/264,578

(22) Filed: Apr. 29, 2014

(65) Prior Publication Data

US 2015/0312327 A1 Oct. 29, 2015

(51) Int. Cl.
*H04L 29/08* (2006.01)
*G01C 21/26* (2006.01)
(Continued)

(52) U.S. Cl.
CPC ............ *H04L 67/10* (2013.01); *B60K 37/00* (2013.01); *B60R 1/00* (2013.01); *G01C 21/26* (2013.01); *G01C 21/34* (2013.01); *G01C 21/3658* (2013.01); *G01C 21/3691* (2013.01); *G01S 7/51* (2013.01); *G01S 17/023* (2013.01); *G01S 17/89* (2013.01); *G01S 17/936* (2013.01); *G01S 19/07* (2013.01); *G01S 19/41* (2013.01); *G06K 9/00785* (2013.01); *G08G 1/096716* (2013.01); *G08G 1/096741* (2013.01);
(Continued)

(58) Field of Classification Search
CPC .. B60W 30/095; B60W 30/096; B60W 30/12; B60W 30/00; B62D 15/026; B62D 6/00; B62D 15/025; G01C 21/165; G01C 21/3492; G01C 21/34; G01C 21/26; G01C 21/3658; G01C 21/3469; G01S 17/023; G01S 19/07; G06K 9/00818; G06K 9/209; G06K 9/00; G08G 1/13; G08G 1/0104; G08G 1/096716; G08G 1/01; G08G 1/09; G08G 1/096861; G08G 1/096775; G05D 3/00; G05D 1/021; G06N 5/04; H04L 67/10
See application file for complete search history.

(56) References Cited

U.S. PATENT DOCUMENTS

| | | | |
|---|---|---|---|
| 4,286,846 A | 9/1981 | Bollenbacher | |
| 6,405,128 B1 | 6/2002 | Bechtolsheim et al. | |

(Continued)

FOREIGN PATENT DOCUMENTS

| | | |
|---|---|---|
| EP | 2177878 A2 | 4/2010 |
| EP | 2234067 A1 | 9/2010 |
| EP | 2260267 A1 | 12/2010 |

OTHER PUBLICATIONS

European Search Report for related European Application 15161806.3, dated Sep. 4, 2015.
(Continued)

*Primary Examiner* — Behrang Badii
(74) *Attorney, Agent, or Firm* — Lempia Summerfield Katz LLC

(57) ABSTRACT

Methods for providing a lane-level road view include: (a) accessing lane-specific data comprising information characterizing a first segment of a first lane of a road in a direction of travel; and (b) communicating at least a portion of the lane-specific data to a client. Apparatuses for providing lane-level road views are described.

19 Claims, 6 Drawing Sheets

(51) Int. Cl.
*G01S 19/07* (2010.01)
*G01C 21/34* (2006.01)
*G01S 17/02* (2006.01)
*G01S 17/89* (2006.01)
*G01S 17/93* (2006.01)
*G01S 7/51* (2006.01)
*G01S 19/41* (2010.01)
*H04L 29/06* (2006.01)
*B60K 37/00* (2006.01)
*B60R 1/00* (2006.01)
*G08G 1/0967* (2006.01)
*G06K 9/00* (2006.01)
*G08G 1/01* (2006.01)
*G01C 21/36* (2006.01)
*B60W 30/14* (2006.01)

(52) U.S. Cl.
CPC ....... *G08G 1/096775* (2013.01); *H04L 67/12* (2013.01); *H04L 67/42* (2013.01); *B60R 2300/301* (2013.01); *B60R 2300/804* (2013.01); *B60W 30/146* (2013.01); *G01C 21/36* (2013.01); *G08G 1/01* (2013.01); *G08G 1/0104* (2013.01)

(56) References Cited

U.S. PATENT DOCUMENTS

| | | |
|---|---|---|
| 6,466,862 B1 | 10/2002 | DeKock et al. |
| 6,911,918 B2 * | 6/2005 | Chen .................... G08G 1/0104 340/905 |
| 8,279,763 B2 | 10/2012 | Rozum et al. |
| 8,346,426 B1 | 1/2013 | Szybalski et al. |
| 8,350,845 B2 | 1/2013 | Soulchin et al. |
| 8,520,695 B1 | 8/2013 | Rubin et al. |
| 9,008,369 B2 * | 4/2015 | Schofield et al. ............ 382/104 |
| 2004/0119612 A1 * | 6/2004 | Chen .................... G08G 1/0104 340/995.13 |
| 2004/0143385 A1 | 7/2004 | Smyth et al. |
| 2007/0013551 A1 * | 1/2007 | Gueziec ............ G01C 21/3492 340/905 |
| 2007/0067100 A1 | 3/2007 | Matsumoto |
| 2009/0037071 A1 * | 2/2009 | Inoue .................. B60W 30/146 701/96 |
| 2009/0140887 A1 * | 6/2009 | Breed et al. .................. 340/990 |
| 2011/0010088 A1 | 1/2011 | Nagase |
| 2012/0283942 A1 | 11/2012 | T'Siobbel et al. |
| 2013/0275033 A1 * | 10/2013 | Bastiaensen .......... G01C 21/26 701/119 |
| 2014/0156182 A1 * | 6/2014 | Nemec .................. G05D 1/021 701/430 |

OTHER PUBLICATIONS

European Search Report and Written Opinion cited in EP15161806, mailed Nov. 6, 2015.

* cited by examiner

LANE LEVEL ROAD VIEWS

TECHNICAL FIELD

The present teachings relate generally to navigation, maps, Advanced Traveler Information Systems (ATIS), Advanced Driver Assistance Systems (ADAS), Highly Assisted Driving (HAD), and the like.

BACKGROUND

Many navigation devices—including but not limited to onboard vehicle navigation systems and map applications on handheld mobile devices—utilize global positioning system (GPS) data.

The accuracy of GPS data is affected by a variety of factors (e.g., satellite position, atmospheric effects, type of connection, etc.), and positioning error on the order of several meters is not uncommon. Indeed, the positioning error inherent in GPS data may even exceed the typical width of a lane on a roadway. As a result, the use of GPS to convey lane level traffic information from a probe vehicle traveling on the roadway may not be feasible. Moreover, if a roadway contains a plurality of adjacent lanes, the probe vehicle and/or the vehicular traffic system to which the probe vehicle reports may be unable to distinguish from which lane the probe report was submitted.

Frequent lane changes are a commonplace observance on many roadways. Oftentimes, the drivers changing lanes do so with the intention of expediting their travel times and reaching their destinations more quickly. However, the decision to change lanes is typically made without knowledge of the latent speed constraints or other limitations that may be present in the adjacent lane further up the road in the direction of travel. Thus, without knowing the looming traffic conditions in the new lane, a driver may find that the new lane—after an initial period and/or distance of improved traffic flow—may actually prove to be slower than the original lane.

SUMMARY

The scope of the present invention is defined solely by the appended claims, and is not affected to any degree by the statements within this summary.

By way of introduction, a method in accordance with the present teachings includes: (a) accessing, by a computer processor, lane-specific data comprising information characterizing a first segment of a first lane of a road in a direction of travel; and (b) communicating, by the computer processor, at least a portion of the lane-specific data to a client.

An apparatus in accordance with the present teachings includes at least one processor and at least one memory including computer program code for one or more programs. The at least one memory and the computer program code are configured to, with the at least one processor, cause the apparatus to perform at least the following: (a) access lane-specific data comprising information characterizing one or a plurality of segments of a first lane of a road in a direction of travel; and (b) communicate at least a portion of the lane-specific data to a client.

A non-transitory computer readable storage medium in accordance with the present teachings has stored therein data representing instructions executable by a programmed processor. The storage medium includes instructions for (a) accessing lane-specific data comprising information characterizing one or a plurality of segments of a first lane of a road in a direction of travel; and (b) communicating at least a portion of the lane-specific data to a client.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
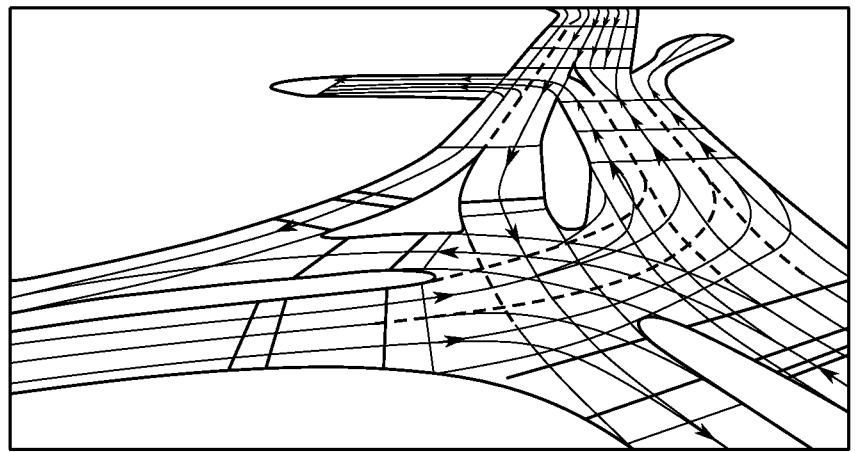
FIG. 1 shows an example of representative lane level information that may be obtained through sensors (e.g., laser, camera, or LIDAR) on a vehicle.

Methods and apparatuses for providing lane level information to a user—including but not limited to lane level speed conditions—have been discovered and are described herein. The manner in which the lane level information is displayed and/or the content of the lane level information may be selected by a user and/or by a content provider (e.g., a vehicular traffic system). By way of example, a simple linear view of speed-related information may be presented to a user (e.g., the driver of a vehicle) as a plurality of contiguous speed buckets. When taken together, these buckets may provide the user with a lane level view of a contiguous stretch of a road. In some embodiments, the speed-related information includes map-based information (e.g., maximum and/or minimum speed limits prescribed for a specific lane of a roadway) and/or real-time speed information (e.g., current maximum speed possible in a given lane based on current traffic conditions) that may or may not be related to the current location of the user's vehicle. In some embodiments, lane level distance information (e.g., the distance in the lane that the vehicle may travel at and/or near the current speed) and/or lane level miscellaneous information (e.g., exits in the lane, turn-by-turn directions for reaching a pre-defined destination from the current location, points-of-interest en route to the destination, and/or the like) may be provided in addition to or as an alternative to speed-related information.

In some embodiments, the present teachings may be used in conjunction with ATIS (Advanced Traveler Information System) technology. At present, ATIS and in-car navigation systems may not provide information for satisfactorily predicting future traffic patterns or conditions. However, in accordance with the present teachings, real-time traffic information at the lane level may be harnessed to improve the overall user experience (UX) for a driver using ATIS and/or related technologies.

In some embodiments, an ATIS feature in accordance with the present teachings is configured to provide a real-time display of sequential buckets of lane level information (e.g., maximum speed limit, minimum speed limit, and/or current average speed; respective distance stretch in km for each speed bucket; exits along each bucket, and/or the like) en route to a driver's destination. In some embodiments, methods and systems in accordance with the present teachings may be used to provide a lane-specific electronic horizon analogous to an electronic horizon as provided by the ADAS architecture described in U.S. Pat. No. 6,405,128 B1. The entire contents of U.S. Pat. No. 6,405,128 B1 are incorporated herein by reference, except that in the event of any inconsistent disclosure or definition from the present specification, the disclosure or definition herein shall be deemed to prevail. In some embodiments, a lane-specific electronic horizon in accordance with the present teachings displays only the current lane of travel. In other embodiments, a lane-specific electronic horizon in accordance with the present teachings displays a plurality of lanes that include the current lane of travel as well as one or more additional adjacent lanes. In some embodiments, methods and systems in accordance with the present teachings may be used to continuously provide an ADAS installed in a motor vehicle with updated lane-specific data about the current lane of travel and/or about one or more adjacent lanes accessible by the vehicle from its current lane.

In some embodiments, a driver may be provided with a virtual view of lane level traffic conditions on the road ahead of the driver's current location through the communication (e.g., via some form of display) of projected data buckets (e.g., speed buckets) in the direction of travel for the driver's current lane and/or for one or more adjacent lanes. Heretofore, such a virtual view of lane level traffic conditions could not be achieved due to lane level information extraction limitations (e.g., the error inherent in GPS data).

In accordance with the present teachings, lane level positioning information and lane level sensing information from a vehicle in transit may be reported (e.g., to a vehicular traffic system or the like) using, for example, recent advances in positioning technologies and/or sensing technologies, as further described below. Moreover, the speed of the vehicle at the lane level may also be provided.

By way of example, with regard to advances in positioning technology, Differential Global Positioning System (DGPS) may be used in some embodiments to obtain lane level location information from a vehicle. In contrast to GPS, which is characterized by a positional accuracy on the order of meters, DGPS provides positional accuracy on the order of centimeters. The improved accuracy of DGPS is typically sufficient to capture the exact lane in which a vehicle is travelling.

With regard to advances in sensing technology, onboard vehicular camera systems may be used in some embodiments—either alternatively to or in addition to positioning information (e.g., DGPS)—to detect the lane markings annotated on a given road and, thereby, to identify the lane in which a vehicle is traveling. FIG. 1 shows an example of representative lane level information that may be obtained through sensors (e.g., laser or LIDAR) on a vehicle. As shown in FIG. 1, vehicular camera systems may clearly identify the different lane markings, such that lane level information may be reported from the vehicle (e.g., a probe vehicle). In some embodiments, a vehicle may be able to report its current lane of travel even without using DGPS.

Figure 2:
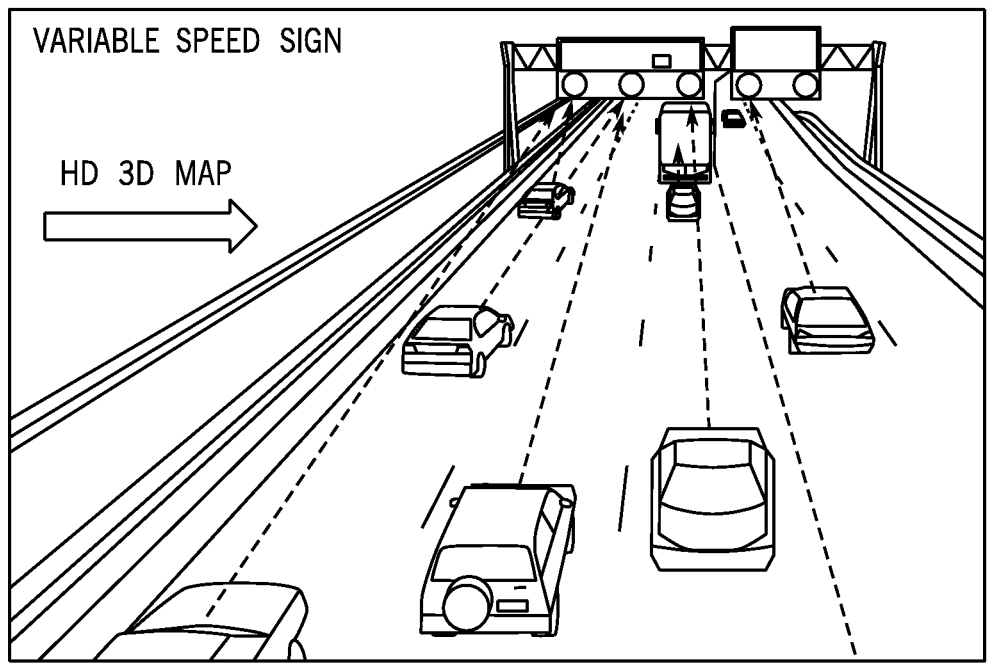
FIG. 2 shows an example of a representative three-dimensional map including lane-variable speed signs.

Based on advances in positioning and camera technology, new lane level applications—including but not limited to lane level variable speed sign (VSS) detection—may be performed in accordance with the present teachings. In addition, positioning and camera advancements may be used in accordance with the present teachings to improve highly assisted driving (HAD) systems through the provision of lane level traffic information in an easy-to-visualize format. By way of example, as shown in FIG. 2, lane level variable speed signs identified using vehicular camera sensors may be displayed to a driver using a three-dimensional map.

In some embodiments, lane level information obtained in accordance with the present teachings may be communicated to human drivers, as described above. In other embodiments, lane level information may likewise be communicated to autonomously operated vehicles. In the case of an autonomously operated vehicle, a driving instruction derived from analysis of lane-specific data may be transmitted to the autonomously operated vehicle (e.g., to an onboard computer processor thereof). The driving instruction (e.g., an instruction to remain in a certain lane, an instruction to switch to a different lane after a predefined time and/or distance, and/or the like) may be the result of an analysis designed to identify optimum lane level routing decisions (e.g., based on speed) in view of the speed buckets on the road ahead. For a fully autonomous vehicle, the driving instruction may simply be transmitted directly to a computer processor (e.g., a processor that is physically aboard the vehicle and/or a processor that is electronically coupled to the vehicle through a wireless connection) without displaying information on a user interface. For a human-assisted vehicle, a user interface may be provided for situations in which the vehicle is being at least partially manually operated.

It is to be understood that elements and features of the various representative embodiments described below may be combined in different ways to produce new embodiments that likewise fall within the scope of the present teachings.

By way of general introduction, a first method in accordance with the present teachings for providing a lane-level road view includes: (a) accessing lane-specific data comprising information characterizing a first segment of a first lane of a road in a direction of travel; and (b) communicating at least a portion of the lane-specific data to a client.

The lane-specific data may further include one or more of the following: information characterizing one or a plurality of additional segments of the first lane of the road in the direction of travel; one or a plurality of segments of an adjacent second lane of the road in the direction of travel; one or a plurality of segments of an adjacent third lane of the road in the direction of travel; one or a plurality of segments of an adjacent fourth or higher (e.g., fifth, sixth, etc.) lane of the road in the direction of travel; and/or the like. A plurality of segments within a specific lane of the road may together define a contiguous (e.g., uninterrupted) stretch of that particular lane.

By way of further general introduction, a second method in accordance with the present teachings for providing a lane-level road view includes: (a) forming a first-lane data bucket; and (b) communicating the first-lane data bucket to a client. The first-lane data bucket characterizes a segment of a first lane of a road in a direction of travel.

The information comprised by the data bucket may include information obtained directly from its original source (e.g., one or a plurality of probe vehicles, map databases, roadway sensors, traffic helicopters, traffic cameras, emergency vehicles, and/or the like) and/or information derived from the original information (e.g., via subsequent processing and/or analysis, etc.). In some embodiments, processing and/or analysis of information obtained from a probe vehicle, map database, and/or the like may be at least partially executed on an external server (e.g., in a vehicular traffic system) and transmitted to a vehicle or group of vehicles. In other embodiments, at least a portion of the processing and/or analysis is performed onboard an individual vehicle.

Throughout this description and in the appended claims, the following definitions are to be understood:

The term "bucket" refers broadly to an assemblage of raw and/or processed data that pertain to at least a section of a designated lane of a roadway. The manner in which a bucket may be communicated to a user is not restricted and, in some embodiments, includes but is not limited to graphical depictions (e.g., linear elements as shown, for example, in FIG. 3 below), numeric values (e.g., speed limits, distances, and/or the like), tabulated information (e.g., such as in Table 1 below), and/or the like.

Figure 6:
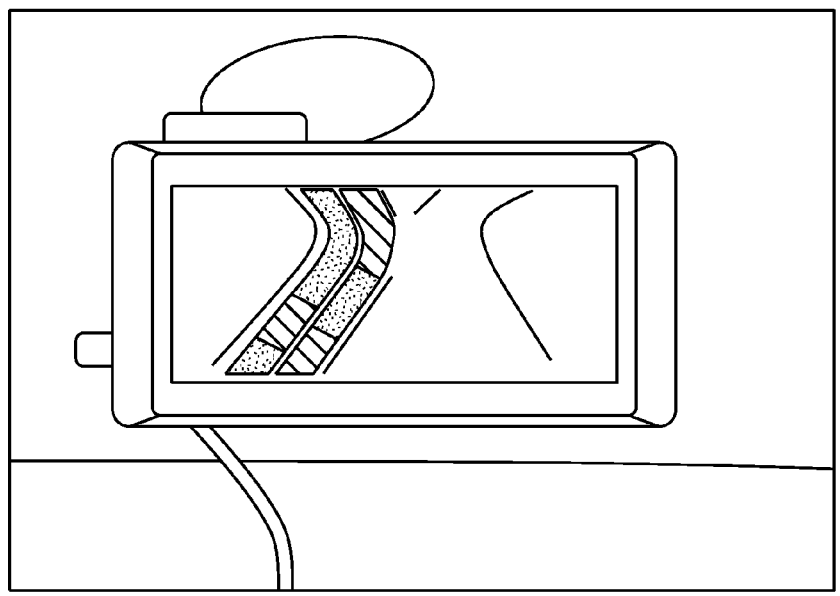
FIG. 6 shows an example of a representative display format for reporting color-coded speed-related information to a user on a vehicular navigation system.

The term "adjacent" as used in reference to two or more lanes of a roadway refers to lanes that are close in proximity to one another but not necessarily immediately adjoining one another. For example, in a three-lane roadway, the leftmost lane may be described herein as being adjacent to the rightmost lane even though an intermediate lane—which is likewise adjacent to the leftmost lane—is interposed therebetween. In some embodiments, adjacent lanes share a common boundary and are not separated by any other lane. In other embodiments, adjacent lanes do not share a common boundary and may be separated by one or more additional lanes. In addition, as used herein, the term "adjacent" as used in reference to lanes of a roadway does not imply that the lanes are parallel to each other along all or even a portion of their respective lengths. Indeed, adjacent lanes may diverge (e.g., as shown in FIG. 6 below), run at non-parallel angles to one another, intersect, and/or the like.

The term "client" refers to one or a plurality of human users (e.g., a human driver operating a vehicle) and/or to one or a plurality of autonomously driven vehicles. As used herein, the term "client" may be used interchangeably with the term "user" unless context dictates otherwise.

In some embodiments, lane-specific data in accordance with the present teachings may be derived from positioning data (e.g., GPS data, DGPS data, and/or the like), sensor data (e.g., LIDAR data and/or the like), or a combination thereof. In some embodiments, GPS data may be sufficiently accurate to be used in accordance with the present teachings— particularly though not exclusively in combination with DGPS data and/or camera sensor data. In other embodiments, positioning data comprises DGPS data without GPS data. In some embodiments, lane-specific data in accordance with the present teachings may include information obtained from one or more probe vehicles.

In some embodiments, the lane-specific data in accordance with the present teachings may comprise a plurality of different speeds. Thus, in some embodiments, a speed associated with a data bucket may correspond to a range of speeds. In other embodiments, a speed associated with a data bucket may correspond to an aggregate (e.g., an average) of substantially similar speeds that lie within a pre-defined range. The phrase "substantially similar" as used in reference to two or more different speeds may refer, in some embodiments, to speeds that are less than about 30% different, in some embodiments less than about 25% different, in some embodiments less than about 20% different, in some embodiments less than about 15% different, in some embodiments less than about 10% different, and in some embodiments less than about 5% different. For embodiments in which an aggregate of substantially similar speeds is reported as an average, all manner of averages and methods for their calculation are contemplated for use in accordance with the present teachings, including but not limited to arithmetic means, medians, geometric medians, mode geometric means, harmonic means, quadratic means, generalized means, weighted means, truncated means, interquartile means, midranges, Winsorized means, annualization, and the like, and combinations thereof. In some embodiments, an average speed comprises a weighted average. In some embodiments, an aggregation algorithm may be used to assign substantially similar speeds into the same data bucket.

Data buckets in accordance with the present teachings may comprise map-based speed information, real-time speed information, distance information, miscellaneous information, or the like, and combinations thereof. Map-based speed information in accordance with the present teachings may include, for example, a maximum speed limit, a minimum speed limit, or the like, and combinations thereof. Distance information in accordance with the present teachings may include, for example, a distance of a segment of a lane and/or a road, a distance over which a particular speed is applicable, a distance remaining before an upcoming turn and/or a change in road, or the like, and combinations thereof. Miscellaneous information in accordance with the present teachings may include, for example, turn-by-turn directions for reaching a pre-defined destination from a current location, map-based location information (e.g., a road name, an exit number, a mile marker number, a range of mile marker numbers, etc.), point-of-interest information (e.g., restaurants, shops, rest areas, service stations, oases, historic sites, scenic overlooks, advertising content, etc.), or the like, and combinations thereof.

Some drivers may be interested in the minimum lane level speed limit (e.g., a driver in an unfamiliar city who wants to exercise proper care while driving), whereas other drivers may be interested in only the maximum lane level speed limit (e.g., a driver who wants to exploit the driving potential of roads within a city). Other drivers may only be interested in current real-time estimates of lane level speed to assist with planning an optimum route for reaching a destination in the shortest amount of time.

Thus, for embodiments in which a data bucket comprises speed-related information, one or a plurality of different speed modes may be selected for display. By way of example, a user may select to display (1) the current maximum possible speed from a current location to a destination; (2) the current minimum possible speed from the current location to the destination; and/or (3) the current real-time speed (e.g., "ground truth" speed) from the current location to the destination.

In some embodiments, when the current maximum speed is selected for display, the lane level view of traffic may show the contiguous upper speed limit values for the respective lanes. In some embodiments, when the current minimum speed is selected for display, the lane level view of traffic may show the contiguous lower speed limit values for the respective lanes. By way of example, some highways have a minimum speed limit at or above which vehicles are expected to travel. In some embodiments, when the current observed real-time speed is selected for display, the lane level view of traffic may show the contiguous lower current travel speed, upper current travel speed, and/or average travel speed (e.g., a speed derived at the lane level in real time from, for example, probe vehicles utilizing DGPS and/or advanced camera technology).

Figure 3:
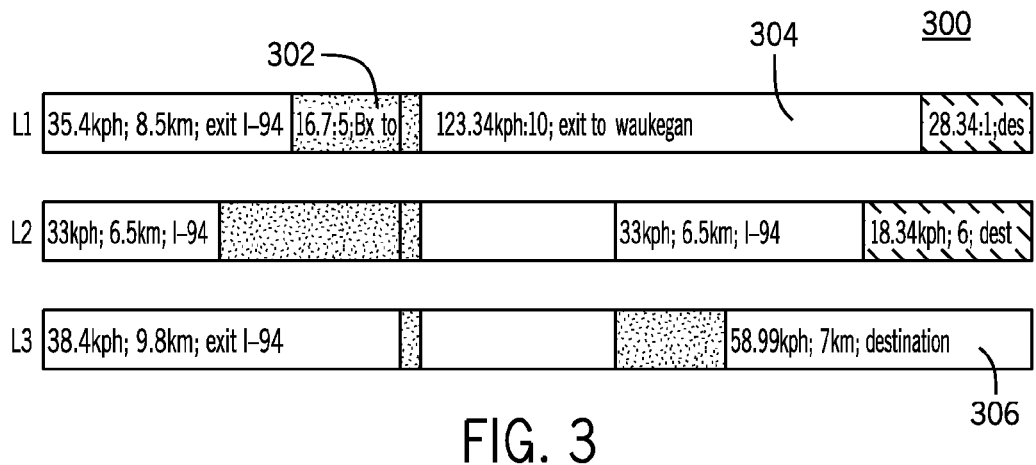
FIG. 3 shows an example of a representative display format for reporting color-coded speed-related information pertaining to an exemplary three-lane road to a user.

FIG. 3 shows an example of a representative display format 300 for reporting color-coded speed-related information pertaining to an exemplary three-lane road to a user. In some embodiments, the color assigned to a data bucket may be based on whether the speed associated with the speed bucket (e.g., as determined by an aggregation algorithm, as described above) is at, below, or above a predefined threshold.

Each of the color-coded linear bands in FIG. 3 represents a data bucket with exemplary data buckets being identified at 302, 304, and 306. In some embodiments, the exemplary view depicted in FIG. 3 may change in relation to the location of a user's vehicle (e.g., the data buckets may update in real time after predefined time thresholds and/or distance thresholds, or based on instantaneous road conditions and/or vehicle location, etc.). In some embodiments, the current lane in which the user is traveling may blink so that the driver may readily identify the current lane in which the vehicle is traveling with a glance. In some embodiments, the current lane may be distinguished from the adjacent lanes via one or more alternative visual mechanisms, including but not limited to, for example, increased size, increased line thickness, prominence of position on display, use of boldfaced fonts, or the like, and combinations thereof.

In some embodiments, as shown in FIG. 3, color may be used to communicate the current observed real-time speeds across each of the three lanes. In such embodiments, a driver may see and evaluate upcoming speed buckets in the current and adjacent lanes in the direction of travel prior to deciding to move to a different lane.

In some embodiments, either in addition to or as an alternative to the type of visual depiction of data buckets shown in FIG. 3, the information comprised in a data bucket may be communicated to a user in other formats—including but not limited to in a tabular format as shown in Table 1 below. The data in Table 1 corresponds to the data depicted in FIG. 3.

TABLE 1

Tabular driver speed view: Display current observed real-time speed.

| Current Observed Real-Time (Kph) | Stretch (Length) in Km | Road Name/POI of Bucket End/Exits |
|---|---|---|
| 35.4 | 8.5 | I-94 Exit |
| 16.7 | 5 | Exit Bx to Evanston |
| 8.24 | 2 | Exit Ax to ev2 |
| 123.34 | 10 | Exit to Waukegan |
| 28.34 | 4 | Destination |
| | LANE 2 | |
| 33 | 6.5 | I-94 Exit |
| 15.25 | 5 | Exit Bx to Evanston |
| 6.53 | 2 | Exit Ax to ev2 |
| 102.21 | 7 | Exit to Waukegan |
| 16.7 | 7 | |
| 18.34 | 6 | Destination |
| | LANE 3 | |
| 38.4 | 9.8 | I-94 Exit |
| 8.24 | 2 | Exit Ax to ev2 |
| 123.34 | 10 | Exit to Waukegan |
| 28.34 | 4 | Destination |
| 58.99 | 7 | Destination |

Although the speed-related information displayed in FIG. 3 and Table 1 corresponds to current observed real-time speeds, other lane level views of speeds may likewise be reported. As described above, other views include but are not limited to current maximum speed limits and/or current minimum speed limits. In some embodiments, the speed-related information provided by the data buckets include each of current observed real-time speed, current maximum speed limit, and current minimum speed limit. In some embodiments, different user interface sub view modes of speed-related information may be displayed. Representative types of sub view modes include but are not limited to (i) a complete list view of all traffic speed-limit buckets between the current location and the destination, (ii) a view of only a subset of the total number of speed-limit buckets (e.g., only two or three) ahead of the current location, (iii) a view of only those speed limit buckets that satisfy (e.g., are at or above, are at or below, etc.) a predefined speed threshold set by the user, or the like, and combinations thereof.

Figure 5:
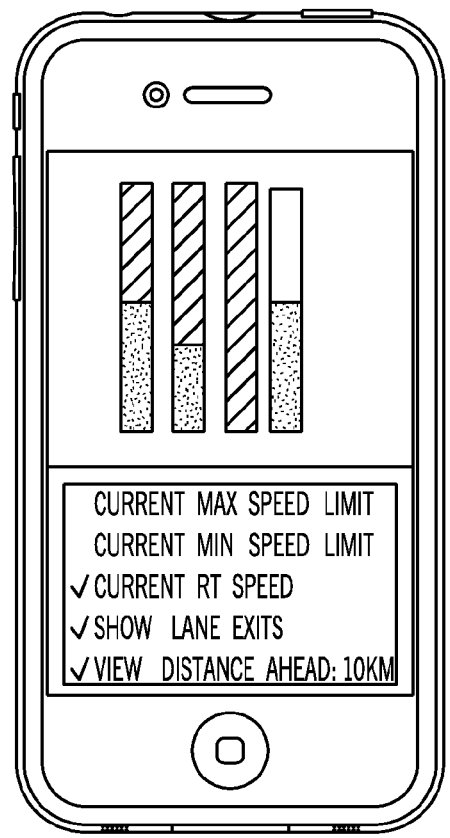
FIG. 5 shows an example of a representative display format for reporting color-coded speed-related information for an exemplary four-lane road to a user on a mobile device.

In some embodiments, one or more data buckets communicated to the client in accordance with the present teachings is related to a current location of the client. In some embodiments, the data buckets are updated automatically to reflect changes in the current location of the client. In some embodiments, as shown in FIGS. 3, 5, and 6, data buckets in accordance with the present teachings may comprise color-coded speed-related information. Solely by way of example, green (a color traditionally associated with "go") may be used to indicate little or no traffic congestion or obstruction and/or the possibility of travel at speeds at or above a predefined threshold (e.g., a posted maximum speed limit, a user-selected desired speed, etc.). Conversely, by way of further example, red (a color traditionally associated with "stop") may be used to indicate very heavy traffic congestion or roadway obstruction, and/or travel speeds at or below a predefined threshold (e.g., a posted minimum speed limit, a user-selected desired speed, etc.). In some embodiments, yellow and/or orange may be used to indicate traffic flow that is intermediate between the extremes represented by green and red. In some embodiments, a user interface analogous to an interface implemented by the data horizon program described in U.S. Pat. No. 6,405,128 B1 may be used.

In some embodiments, the communicating of one or more data buckets to a client may comprise visually displaying the data buckets. By way of example, the data buckets may be displayed via a navigation system, a mobile phone, a tablet, a projection (e.g., onto a windshield, dashboard, console, and/or other interior surface of a vehicle, etc.), or the like, and combinations thereof. By way of example, FIG. 5 shows a simplified view of speed buckets on a four-lane road as displayed on a representative mobile device. In the example shown in FIG. 5, contrary to the depiction shown in FIG. 3, the distance and exit information are not included. Rather, only color-coded lane level speeds, as determined from lane level information received from probe vehicles, are shown. Oftentimes, drivers are interested only in speed potentials—not in the map and/or in other related information. Thus, for such drivers, a simplified speed view such as that shown in FIG. 5 may suffice. Similarly, FIG. 6 shows a simplified view of speed buckets as displayed on a representative vehicular navigation system.

In some embodiments, the communicating of one or more data buckets to a client may comprise aurally communicating information comprised by the data buckets to the user (e.g., through a user interface). In some embodiments, the user may interact with an artificial intelligence (e.g., an intelligent personal assistant or the like) to request that certain information be repeated, to request alternate information, and/or the like using, for example, a voice command device and/or the like.

In some embodiments, a method in accordance with the present teachings further comprises one or a plurality of the following additional acts: (c) forming a second-lane data bucket that characterizes a segment of an adjacent lane of the road in the direction of travel; (d) communicating the second-lane data bucket to the client; (e) forming a plurality of first-lane data buckets, each of which characterizes and corresponds to a different segment of the first lane in the direction of travel; (f) communicating at least a portion of the plurality of first-lane data buckets to the client; (g) forming a plurality of second-lane data buckets, each of which characterizes and corresponds to a different segment of an adjacent lane of the road in the direction of travel; (h) communicating at least a portion of the plurality of second-lane data buckets to the client; (i) forming a plurality of third-lane data buckets, each of which characterizes and corresponds to a different segment of a different adjacent lane in the direction of travel; (j) communicating at least a portion of the plurality of third-lane data buckets to the client; and/or (k) selecting a desired display format and/or content for the first-lane data bucket.

In some embodiments, for a road that contains four or more lanes, a method in accordance with the present teachings may further comprise forming one or a plurality of fourth-lane data buckets and, in some embodiments, one or a plurality of even higher-lane (e.g., fifth, sixth, etc.) data buckets. It is to be understood that the number of lanes on a road is not restricted, and that methods in accordance with the present teachings may be applied to both single-lane roads and multi-lane roads. A data bucket in accordance with the present teachings may include information obtained from one or a plurality of second-lane probe vehicles, map databases, roadway sensors, traffic helicopters, traffic cameras, emergency vehicles, and/or the like, and/or information derived therefrom (e.g., via subsequent processing and/or analysis, etc.).

In some embodiments, a method in accordance with the present teachings for providing a lane-level road view is implemented using a computer and, in some embodiments, one or a plurality of the above-described acts are performed by one or a plurality of processors. In some embodiments, one or more of the one or the plurality of processors include graphics processing units (GPUs). In other embodiments, one or more of the one or the plurality of processors include central processing units (CPUs). In some embodiments, methods in accordance with the present teachings are implemented entirely on GPUs. In some embodiments, GPUs provide improved and/or faster performance.

In some embodiments, a plurality of same-lane data buckets (e.g., a plurality of first-lane data buckets, a plurality of second-lane data buckets, a plurality of third-lane data buckets, and/or a plurality of fourth- or higher-lane data buckets)—taken together sequentially—may characterize a contiguous (e.g., uninterrupted) stretch of lane along the road.

Figure 4:
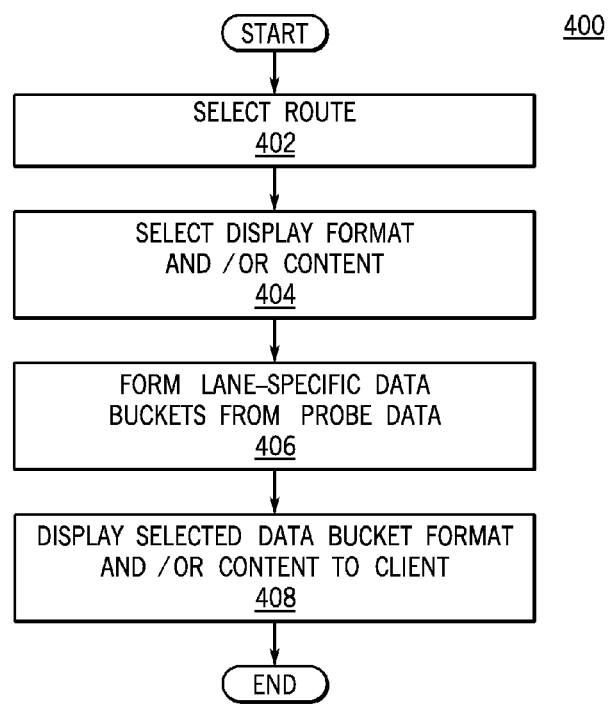
FIG. 4 shows a flow chart of an exemplary process for providing a lane-level road view.

FIG. 4 shows an exemplary flow chart of a representative method 400 for providing a lane-level road view. At block 402, a user may optionally request directions from a current location to a target destination and, in some embodiments, may select the desired route for reaching a destination from among a plurality of available options. At block 404, the user may select the desired display format and/or content of information to be communicated (e.g., in some embodiments, in the form of data buckets). In some embodiments, the selection at block 404 may be made by a vehicular traffic system on behalf of the user. At block 406, one or more lane-specific data buckets may be formed that comprise information obtained and/or derived from one or a plurality of probe vehicles, map databases (e.g., speed limits obtained directly from a map), roadway sensors, traffic helicopters, traffic cameras, emergency vehicles, and/or the like. At block 408, the information to be communicated to the user is displayed according to the selected format and with the selected content as determined at block 404.

It is to be understood that the relative ordering of some acts shown in the flow chart of FIG. 4 is meant to be merely representative rather than limiting, and that alternative sequences may be followed. Moreover, it is likewise to be understood that additional, different, or fewer acts may be provided. By way of non-limiting and representative example, in FIG. 4, the acts of selecting a route 402 and selecting a display format and/or content 404 are optional and may be omitted. Moreover, one or more additional acts—for example, the act of receiving probe data from one or a plurality of probe vehicles (not shown)—may be added. Furthermore, in some embodiments, the acts may occur in a different sequential order and/or one or more of the acts may occur substantially contemporaneously.

In some embodiments, as described above, the present teachings provide methods for providing a lane-level road view. In other embodiments, as further described below, the present teachings also provide apparatuses for providing lane-level road view.

Figure 7:
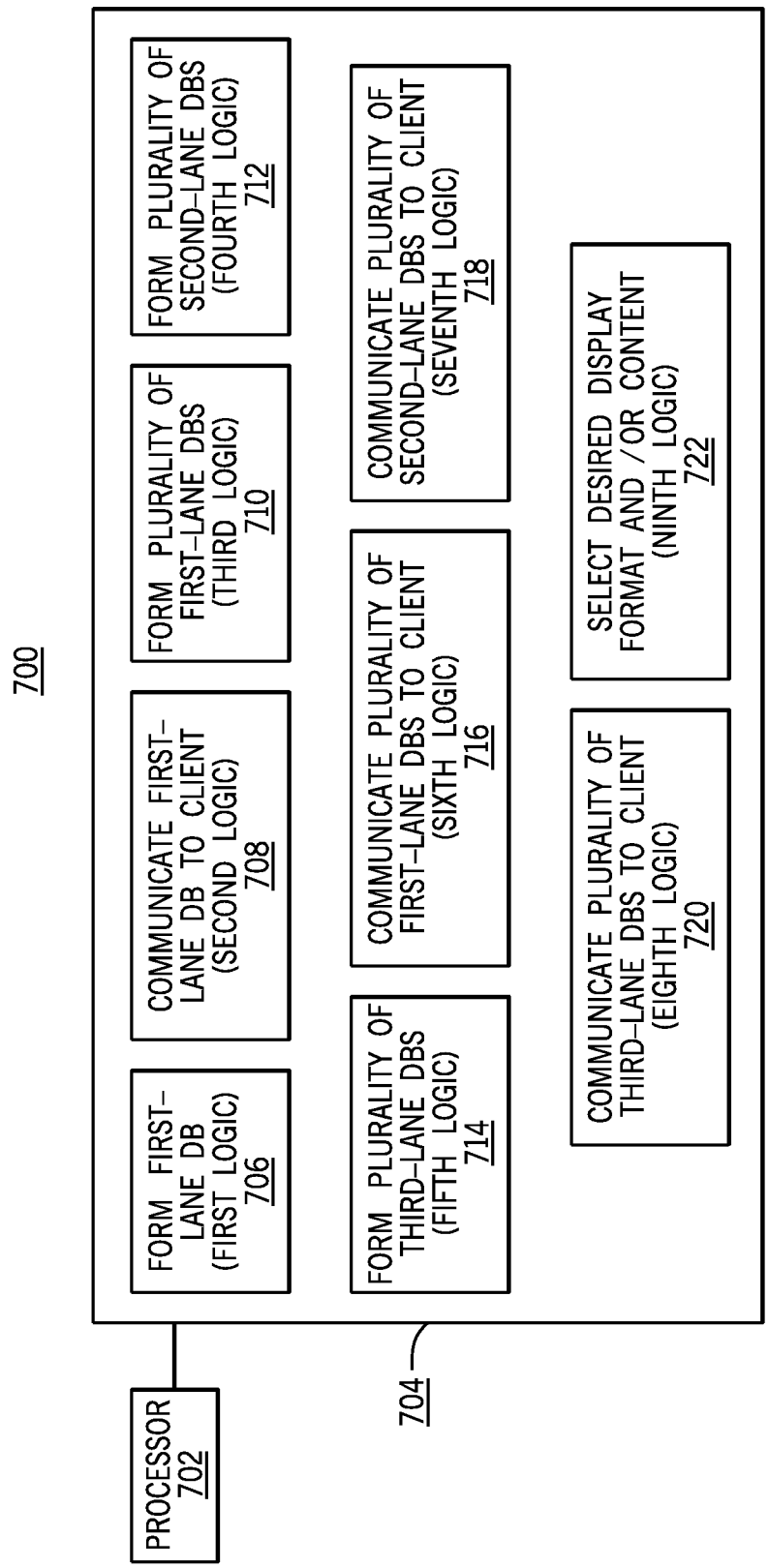
FIG. 7 shows a block diagram of a representative apparatus 700 in accordance with the present teachings for providing a lane-level road view.

FIG. 7 shows a block diagram of a representative apparatus 700 in accordance with the present teachings for providing a lane-level road view. In some embodiments, as shown in FIG. 7, an apparatus 700 in accordance with the present teachings is implemented as part of a GPU in a computer system. In other embodiments, the apparatus 700 may be implemented as part of a CPU in a computer system.

In some embodiments, as shown in FIG. 7, the apparatus 700 may include: a processor 702; a non-transitory memory 704 coupled with the processor 702; first logic 706 stored in the non-transitory memory 704 and executable by the processor 702 to cause the apparatus 700 to form a first-lane data bucket (DB) that characterizes a segment of a first lane of a road in a direction of travel; and second logic 708 stored in the non-transitory memory 704 and executable by the processor 702 to cause the apparatus 700 to communicate the first-lane data bucket to a client.

In some embodiments, the apparatus 700 may further include one or more of the following: third logic 710 stored in the non-transitory memory 704 and executable by the processor 702 to cause the apparatus 700 to form a plurality of first-lane data buckets each of which characterizes and corresponds to a different segment of the first lane of the road in the direction of travel; fourth logic 712 stored in the non-transitory memory 704 and executable by the processor 702 to cause the apparatus 700 to form a plurality of second-lane data buckets, each of which characterizes and corresponds to a different segment of an adjacent lane of the road in the direction of travel; fifth logic 714 stored in the non-transitory memory 704 and executable by the processor 702 to cause the apparatus 700 to form a plurality of third-lane data buckets, each of which characterizes and corresponds to a different segment of a further adjacent lane of the road in the direction of travel; sixth logic 716 stored in the non-transitory memory 704 and executable by the processor 702 to cause the apparatus 700 to communicate at least a portion of the plurality of first-lane data buckets to the client; seventh logic 718 stored in the non-transitory memory 704 and executable by the processor 702 to cause the apparatus 700 to communicate at least a portion of the plurality of second-lane data buckets to the client; eighth logic 720 stored in the non-transitory memory 704 and executable by the processor 702 to cause the apparatus 700 to communicate at least a portion of the plurality of third-lane data buckets to the client; and/or ninth logic 722 stored in the non-transitory memory 704 and executable by the processor 702 to cause the apparatus 700 to select a desired display format and/or content for information communicated to the client.

In some embodiments, the apparatus 700 is configured as a device selected from the group consisting of navigation systems, mobile phones, personal computers, game consoles, laptops, notebooks, tablets, portable media players, personal digital assistants, pagers, and the like, and combinations thereof. In some embodiments, the apparatus 700 is configured as a navigation system and/or a mobile phone and further includes: (a) user interface circuitry and user interface software configured to (i) facilitate user control of at least some functions of the navigation system and/or mobile phone though use of a display and (ii) respond to user inputs; and (b) a display and display circuitry configured to display at least a portion of a user interface of the navigation system and/or mobile phone, the display and the display circuitry configured to facilitate user control of at least some of the functions of the navigation system and/or mobile phone.

A non-transitory computer-readable storage medium in accordance with the present teachings has stored therein data representing instructions executable by a programmed processor for providing a lane level road view. The storage medium includes instructions for: (a) accessing lane-specific data comprising information characterizing one or a plurality of segments of a first lane of a road in a direction of travel; and (b) communicating at least a portion of the lane-specific data to a client.

One skilled in the art will appreciate that one or more modules or logic described herein may be implemented using, among other things, a tangible computer-readable medium comprising computer-executable instructions (e.g., executable software code). Alternatively, modules may be implemented as software code, firmware code, hardware, and/or a combination of the aforementioned.

Figure 8:
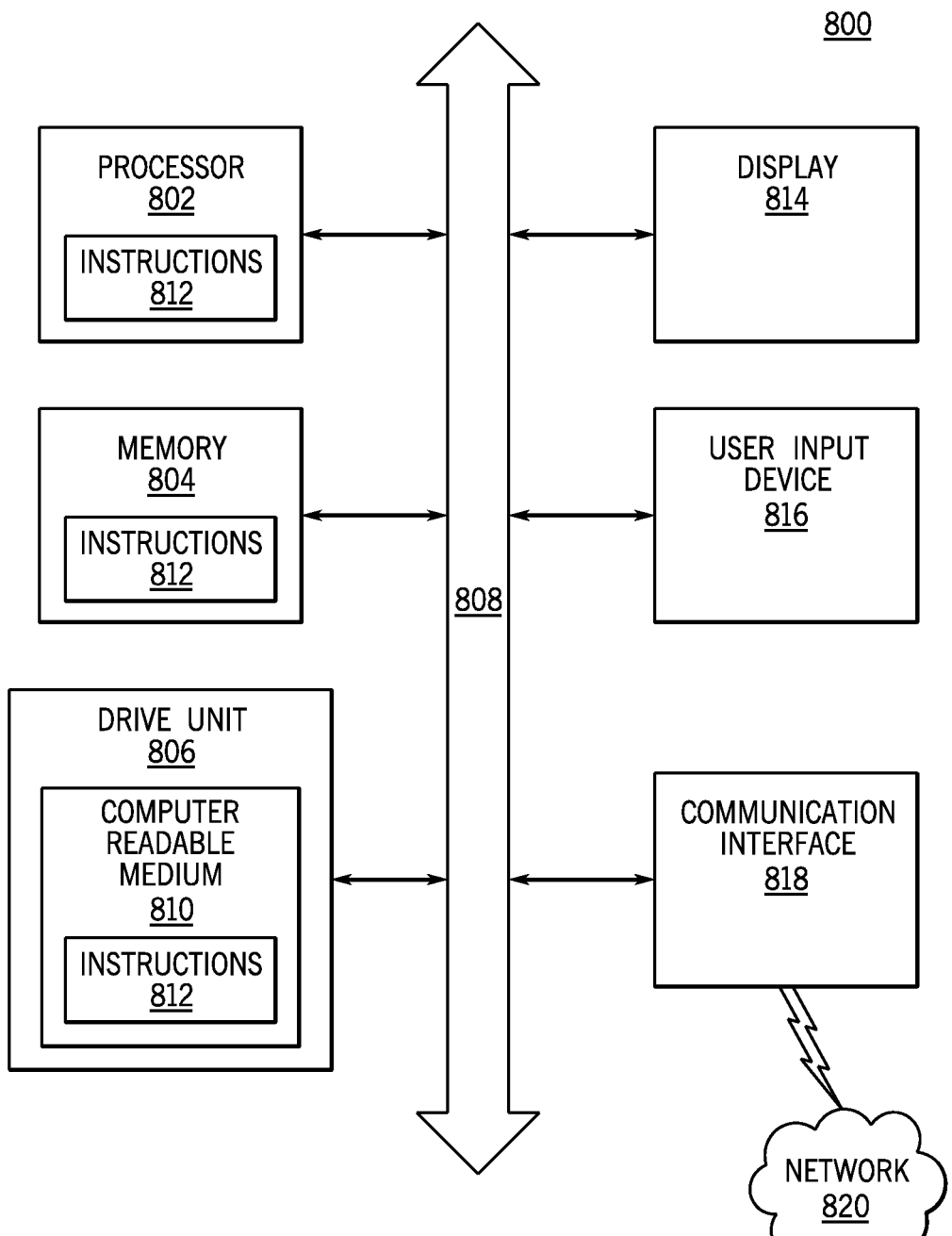
FIG. 8 shows a representative general computer system 800 for use with an apparatus in accordance with the present teachings.

FIG. 8 depicts an illustrative embodiment of a general computer system 800. The computer system 800 can include a set of instructions that can be executed to cause the computer system 800 to perform any one or more of the methods or computer based functions disclosed herein. The computer system 800 may operate as a standalone device or may be connected (e.g., using a network) to other computer systems or peripheral devices. Any of the components discussed above, such as the processor, may be a computer system 800 or a component in the computer system 800. The computer system 800 may implement a navigation module for providing a lane level road view, of which the disclosed embodiments are a component thereof.

In a networked deployment, the computer system 800 may operate in the capacity of a server or as a client user computer in a client-server user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a landline telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In some embodiments, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As shown in FIG. 8, the computer system 800 may include a processor 802, for example a central processing unit (CPU), a graphics-processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analyzing and processing data. The processor 802 may implement a software program, such as code generated manually (i.e., programmed).

The computer system 800 may include a memory 804 that can communicate via a bus 808. The memory 804 may be a main memory, a static memory, or a dynamic memory. The memory 804 may include, but is not limited to, computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In some embodiments, the memory 804 includes a cache or random access memory for the processor 802. In alternative embodiments, the memory 804 is separate from the processor 802, such as a cache memory of a processor, the system memory, or other memory. The memory 804 may be an external storage device or database for storing data. Examples include a hard drive, compact disc (CD), digital video disc (DVD), memory card, memory stick, floppy disc, universal serial bus (USB) memory device, or any other device operative to store data. The memory 804 is operable to store instructions executable by the processor 802. The functions, acts or tasks illustrated in the figures or described herein may be performed by the programmed processor 802 executing the instructions 812 stored in the memory 804. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown in FIG. 8, the computer system 800 may further include a display unit 814, such as a liquid crystal display (LCD), an organic light emitting diode (OLED), a flat panel display, a solid state display, a cathode ray tube (CRT), a projector, a printer or other now known or later developed display device for outputting determined information. The display 814 may act as an interface for the user to see the functioning of the processor 802, or specifically as an interface with the software stored in the memory 804 or in the drive unit 806.

Additionally, as shown in FIG. 8, the computer system 800 may include an input device 816 configured to allow a user to interact with any of the components of system 800. The input device 816 may be a number pad, a keyboard, or a cursor control device, such as a mouse, or a joystick, touch screen display, remote control or any other device operative to interact with the system 800.

In some embodiments, as shown in FIG. 8, the computer system 800 may also include a disk or optical drive unit 806. The disk drive unit 806 may include a computer-readable medium 810 in which one or more sets of instructions 812 (e.g., software) can be embedded. Further, the instructions 812 may embody one or more of the methods or logic as described herein. In some embodiments, the instructions 812 may reside completely, or at least partially, within the memory 804 and/or within the processor 802 during execution by the computer system 800. The memory 804 and the processor 802 also may include computer-readable media as described above.

The present teachings contemplate a computer-readable medium that includes instructions 812 or receives and executes instructions 812 responsive to a propagated signal, so that a device connected to a network 820 can communicate voice, video, audio, images or any other data over the network 820. Further, the instructions 812 may be transmitted or received over the network 820 via a communication interface 818. The communication interface 818 may be a part of the processor 802 or may be a separate component. The communication interface 818 may be created in software or may be a physical connection in hardware. The communication interface 818 is configured to connect with a network 820, external media, the display 814, or any other components in system 800, or combinations thereof. The connection with the network 820 may be a physical connection, such as a wired Ethernet connection or may be established wirelessly as discussed below. Likewise, the additional connections with other components of the system 800 may be physical connections or may be established wirelessly.

The network 820 may include wired networks, wireless networks, or combinations thereof. The wireless network may be a cellular telephone network, an 802.11, 802.16, 802.20, or WiMax network. Further, the network 820 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of subject matter described in this specification can be implemented as one or more computer program products, for example, one or more modules of computer program instructions encoded on a computer-readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer-readable medium can be a machine-readable storage device, a machine-readable storage substrate, a memory device, or a combination of one or more of them. The term "data processing apparatus" encompasses all apparatuses, devices, and machines for processing data, including but not limited to, by way of example, a programmable processor, a computer, or multiple processors or computers. The apparatus can include, in addition to hardware, code that creates an execution environment for the computer program in question (e.g., code that constitutes processor firmware, a protocol stack, a database management system, an operating system, or a combination thereof).

In some embodiments, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the present teachings are considered to include any one or more of a computer-readable medium or a distribution medium and other equivalents and successor media, in which data or instructions may be stored.

In some embodiments, dedicated hardware implementations, such as application specific integrated circuits, programmable logic arrays, and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In some embodiments, the methods described herein may be implemented by software programs executable by a computer system. Further, in some embodiments, implementations can include distributed processing, component/object distributed processing, and parallel processing. Alternatively, virtual computer system processing can be constructed to implement one or more of the methods or functionality as described herein.

Although the present teachings describe components and functions that may be implemented in particular embodiments with reference to particular standards and protocols, the present invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform functions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The main elements of a computer are a processor for performing instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio player, a Global Positioning System (GPS) receiver, to name just a few. Computer-readable media suitable for storing computer program instructions and data include all forms of non volatile memory, media and memory devices, including but not limited to, by way of example, semiconductor memory devices (e.g., EPROM, EEPROM, and flash memory devices); magnetic disks (e.g., internal hard disks or removable disks); magneto optical disks; and CD ROM and DVD-ROM disks. The processor and the memory can be supplemented by, or incorporated in, special purpose logic circuitry.

To provide for interaction with a user, some embodiments of subject matter described herein can be implemented on a device having a display, for example a CRT (cathode ray tube) or LCD (liquid crystal display) monitor, for displaying information to the user and a keyboard and a pointing device, for example a mouse or a trackball, by which the user can provide input to the computer. Other kinds of devices can be used to provide for interaction with a user as well. By way of example, feedback provided to the user can be any form of sensory feedback (e.g., visual feedback, auditory feedback, or tactile feedback); and input from the user can be received in any form, including but not limited to acoustic, speech, or tactile input.

Embodiments of subject matter described herein can be implemented in a computing system that includes a back-end component, for example, as a data server, or that includes a middleware component, for example, an application server, or that includes a front end component, for example, a client computer having a graphical user interface or a Web browser through which a user can interact with an implementation of the subject matter described in this specification, or any combination of one or more such back end, middleware, or front end components. The components of the system can be interconnected by any form or medium of digital data communication, for example, a communication network. Examples of communication networks include but are not limited to a local area network (LAN) and a wide area network (WAN), for example, the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 CFR §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding claim—whether independent or dependent—and that such new combinations are to be understood as forming a part of the present specification.

The foregoing detailed description and the accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

The invention claimed is:

1. A method comprising:
accessing, by a computer processor, lane-specific data comprising information characterizing a current observed real-time traffic speed and a distance associated with a first segment of a first lane of a road in a direction of travel;
communicating, by the computer processor, at least a portion of the lane-specific data to a client including lane-specific traffic speed, the lane-specific traffic speed including a current maximum possible speed and a current minimum possible speed and the current real-time speed;
providing a visual indication of at least a portion of the lane-specific data indicating the current real-time traffic speed, the current maximum possible speed and the current minimum possible speed, and the distance of the first segment for display on the client;
changing the visual indication for display based on dynamically updated lane-specific data;
wherein providing the visual indication of at least a portion of the lane-specific data includes the lane-specific data communicated to the client comprise color-coded speed-related information indicating the current observed real-time traffic speed; and
wherein the color is based on a range of speed of a mean speed of the current observed real-time traffic speed of a plurality of vehicles traversing the first segment.

2. The method of claim 1 wherein the lane-specific data further comprise information characterizing one or a plurality of additional segments of the first lane of the road in the direction of travel.

3. The method of claim 2 wherein the first segment and the one or the plurality of additional segments together characterize a contiguous stretch of the first lane.

4. The method of claim 1 wherein the lane-specific data further comprise information characterizing a first segment of an adjacent second lane of the road in the direction of travel.

5. The method of claim 4 wherein the lane-specific data further comprise information characterizing one or a plurality of additional segments of the adjacent second lane of the road in the direction of travel.

6. The method of claim 4 wherein the lane-specific data further comprise information characterizing a first segment of an adjacent third lane of the road in the direction of travel.

7. The method of claim 6 wherein the lane-specific data further comprise information characterizing one or a plurality of additional segments of the adjacent third lane of the road in the direction of travel.

8. The method of claim 1 wherein the communicating comprises displaying the lane-specific data via a navigation system, a mobile phone, a tablet, a projection, or a combination thereof.

9. The method of claim 1 further comprising selecting a desired display format and/or content for the lane-specific data.

10. The method of claim 1 wherein the lane-specific data are derived from positioning data, sensor data, or a combination thereof.

11. The method of claim 10 wherein the positioning data comprises differential global positioning system (DGPS) data.

12. The method of claim 10 wherein the sensor data comprises LIDAR data.

13. The method of claim 1 wherein the lane-specific data comprise map-based speed information, real-time speed information, distance information, miscellaneous information, or a combination thereof.

14. The method of claim 13 wherein the map-based speed information comprises a maximum speed limit, a minimum speed limit, or a combination thereof; wherein the distance information comprises a distance of the segment; and wherein the miscellaneous information comprises turn-by-turn directions for reaching a pre-defined destination from a current location, map-based location information, point-of-interest information, or a combination thereof.

15. The method of claim 1 wherein the lane-specific data communicated to the client are based on a current geographical location of the client.

16. The method of claim 1
wherein the client comprises an autonomously operated vehicle,
wherein the visual indication of at least the portion of the lane-specific data indicating the current observed real-time traffic speed is provided for display to a passenger of the autonomously operated vehicle,
wherein the communicating comprises transmitting to a computer processor aboard the autonomously operated vehicle a driving instruction that is derived from analysis of at least a portion of the lane-specific data, and wherein the driving instruction is further derived from a lane selection of the passenger received via an input of the autonomously operated vehicle.

17. An apparatus comprising:

at least one processor; and at least one memory including computer program code for one or more programs, the at least one memory and the computer program code configured to, with the at least one processor, cause the apparatus to perform at least the following:

access lane-specific data comprising information characterizing a current observed real-time traffic speed, a current maximum possible speed and the current minimum possible speed, and a distance associated with one or a plurality of segments of a first lane of a road in a direction of travel;

communicate at least a portion of the lane-specific data to a client including lane-specific current observed real-time traffic speed and the current maximum possible speed and the current minimum possible speed;

provide a visual indication of at least a portion of the lane-specific data indicating the current observed real-time traffic speed and the distance of the first segment for display on the client;

change the visual indication for display based on dynamically updated lane-specific data;

wherein providing the visual indication of at least a portion of the lane-specific data includes the lane-specific data communicated to the client comprise color-coded speed-related information indicating the current observed real-time traffic speed; and wherein the color is based on a range of speed of a mean speed of the current observed real-time traffic speed of a plurality of vehicles traversing the first segment.

18. The apparatus of claim 17 wherein:

the lane-specific data further comprise information characterizing one or a plurality of segments of an adjacent second lane of the road in the direction of travel and information characterizing one or a plurality of segments of an adjacent third lane of the road in the direction of travel; and wherein the at least one memory and the computer program code are further configured to, with the at least one processor, cause the apparatus to select a desired display format and/or content for information communicated to the client.

19. A non-transitory computer-readable storage medium having stored therein data representing instructions executable by a programmed processor, the storage medium comprising instructions for:

accessing lane-specific data comprising information characterizing a current observed real-time traffic speed, a current maximum possible speed and a current minimum possible speed, and a distance associated with one or a plurality of segments of a plurality of lanes of a road in a same direction of travel;

communicating at least a portion of the lane-specific data to a client including lane-specific traffic speed, the lane-specific traffic speed including a current maximum possible speed and a current minimum possible speed and the current real-time speed;

providing a visual indication of at least a portion of the lane-specific data indicating the current observed real-time traffic speed and the distance of the first segment for display on the client;

changing the visual indication for display via the client based on dynamically updated lane-specific data;

wherein providing the visual indication of at least a portion of the lane-specific data includes the lane-specific data communicated to the client comprise color-coded speed-related information indicating the current observed real-time traffic speed; and wherein the color is based on a range of speed of a mean speed of the current observed real-time traffic speed of a plurality of vehicles traversing the first segment.

* * * * *